US010519980B2

(12) United States Patent
Maniere et al.

(10) Patent No.: US 10,519,980 B2
(45) Date of Patent: Dec. 31, 2019

(54) TURBOMACHINE COMPONENT OR COLLECTION OF COMPONENTS AND ASSOCIATED TURBOMACHINE

(71) Applicant: SAFRAN AIRCRAFT ENGINES, Paris (FR)

(72) Inventors: Vianney Christophe Marie Maniere, Moissy-Cramayel (FR); Matthieu Jean Luc Vollebregt, Moissy-Cramayel (FR); Gaetan Jean Marie Loupy, Moissy-Cramayel (FR); Paul Henri Joseph Mauclair, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 747 days.

(21) Appl. No.: 15/105,359

(22) PCT Filed: Dec. 18, 2014

(86) PCT No.: PCT/FR2014/053437
§ 371 (c)(1),
(2) Date: Jun. 16, 2016

(87) PCT Pub. No.: WO2015/092306
PCT Pub. Date: Jun. 25, 2015

(65) Prior Publication Data
US 2017/0009781 A1    Jan. 12, 2017

(30) Foreign Application Priority Data
Dec. 18, 2013 (FR) ..................... 13 62927

(51) Int. Cl.
*F04D 29/66* (2006.01)
*F01D 5/14* (2006.01)
(Continued)

(52) U.S. Cl.
CPC ......... *F04D 29/667* (2013.01); *F04D 29/321* (2013.01); *F04D 29/542* (2013.01); *F04D 29/681* (2013.01)

(58) Field of Classification Search
CPC .......... F01D 5/145; F01D 5/143; F01D 5/146; F01D 5/14; F01D 11/006; F04D 29/68;
(Continued)

(56) References Cited

U.S. PATENT DOCUMENTS 3,039,736 A * 6/1962 Pon ......................... F01D 5/145
    415/195
4,023,350 A * 5/1977 Hovan ..................... F01D 5/145
    415/208.2
(Continued)

FOREIGN PATENT DOCUMENTS

EP    0 978 632 A1    2/2000
EP    1 927 723 A1    6/2008
(Continued)

OTHER PUBLICATIONS

Greim, Ralf Havakechian, Said Gut, Rainer, "Turbomachine with intermediate blades as flow dividers", Sep. 2, 2000, EPO, EP 0978632 A1, Machine translation, 1-9 (Year: 2000).*
(Continued)

*Primary Examiner* — Justin D Seabe
*Assistant Examiner* — Joshua A Beebe
(74) *Attorney, Agent, or Firm* — Oblon, McClelland, Maier & Neustadt, L.L.P.

(57) ABSTRACT

A turbomachine component or collection of components includes a first blade and a second blade and a platform from which the blades extend. The platform, between the pressure face of the first blade and the suction face of the second blade, has a non-axisymmetric surface defining a plurality of fins of substantially triangular section extending downstream of a leading edge of each of the blades. Each fin is associated with a leading position and a trailing position on the surface, between which positions the fin extends, such that the leading position is situated at between 5% and 35%
(Continued)

length relative to a chord of the blade extending from a leading edge to a trailing edge of the blade. The further a fin is from the suction face of the second blade, the further the leading position of the fin is axially from the leading edge of the blades.

14 Claims, 5 Drawing Sheets

(51) Int. Cl.
F04D 29/32 (2006.01)
F04D 29/54 (2006.01)
F04D 29/68 (2006.01)

(58) Field of Classification Search
CPC .... F04D 29/681; F04D 29/667; F04D 29/321; F04D 29/542; F04D 29/66; F05D 2250/11; Y02T 50/673
See application file for complete search history.

(56) References Cited

U.S. PATENT DOCUMENTS

| | | | | |
|---|---|---|---|---|
| 4,420,288 | A * | 12/1983 | Bischoff | F01D 5/145 416/244 A |
| 6,213,711 | B1 * | 4/2001 | Muller | F01D 5/145 415/191 |
| 8,303,258 | B2 * | 11/2012 | Aubin | F01D 5/143 416/193 A |
| 2010/0143140 | A1 | 6/2010 | Guemmer | |
| 2010/0303627 | A1 * | 12/2010 | Megerle | F01D 5/143 416/179 |

FOREIGN PATENT DOCUMENTS

| | | |
|---|---|---|
| EP | 2 194 232 A2 | 6/2010 |
| EP | 2 261 462 A1 | 12/2010 |
| JP | 52-54808 | 5/1977 |
| JP | 54-151707 A | 11/1979 |
| JP | 60-22002 A | 2/1985 |

OTHER PUBLICATIONS

Hage, Wolfram, Meyer, Robert, "Stator-Stufe eines Axialverdicthers einer Stromungsmaschine mit Querlamellen zur Wirkungsgradsteigerung", Jun. 4, 2008, EPO, E 1927723 A1, Machine Translation, 1-10 (Year: 2008).*

French Preliminary Search Report dated Mar. 27, 2014 in Patent Application No. 1362927 (with English Translation of Category of Cited Documents).

International Search Report and Written Opinion dated Mar. 24, 2015 in PCT /FR2014/053437 (with English Translation of International Search Report).

* cited by examiner

TURBOMACHINE COMPONENT OR COLLECTION OF COMPONENTS AND ASSOCIATED TURBOMACHINE

GENERAL TECHNICAL FIELD

The present invention relates to a turbomachine part comprising blades and a platform having a non-axisymmetric surface.

PRIOR ART

The necessity of constantly improving the performance of equipment, particularly aeronautical equipment, for example the rotors of turbojets (i.e, the assembly formed by a hub to which are attached vanes extending radially, as shown in FIG. 1), has imposed at present the use of computer modeling tools.

These tools help in designing parts by automatically optimizing certain of their characteristics by executing a large number of simulation calculations.

The search for a geometric aeromechanical and/or acoustic optimum in rotors or stators leads at present to achieving hubs having a locally non-axisymmetric wall (i.e, a section in a plane perpendicular to the axis of rotation is not circular) at the vein, i.e, the set of channels for the flow of fluid between the vanes (in other words, the inter-vane sections), reflecting the particular conditions prevailing there. The non-axisymmetric vein defines a generally annular surface of a three-dimensional space (a "slice" of the hub).

It is observed, however, that these geometries can still be improved, in particular in the compressor stages of the turbomachine. In fact, the blade/wall connections remain the site of secondary flows (and therefore of considerable losses in the compressor stages), due to the proximity of the wall on which a considerable boundary layer develops from upstream of the compressor, and the pressure gradient established from the extrados of an blade to the intrados of the adjoining blade.

The combination of these elements generates an upwelling of fluid with low energy on the extrados of each blade, and is manifested downwind by considerable vortices, which are the source of losses. Also observed is excessive deflection near the wall and reduced deflection above.

It would be desirable to have available a new geometry making it possible to correct these problems so as to improve performance in terms of efficiency of the equipment, but without degrading either operability or mechanical strength.

PRESENTATION OF THE INVENTION

The present invention thus proposes a part or set of parts of a turbomachine comprising at least first and second blades, and a platform from which the blades extend, characterized in that the platform has, between the intrados of the first blade and the extrados of the second blade, a non-axisymmetric surface defining a plurality of fins with a substantially triangular section extending downstream of a leading edge of each of the blades, each fin being associated with a leading position and a trailing position on the surface between which the fins extends, such that:
  the leading position is located at between 5% and 35% of the relative length of a chord of an blade extending from a leading edge to a trailing edge of the blade;
  the more a fin is separated from the extrados of the second blade, the more the leading position of said fin is axially separated from the leading edge of the blades.

The fin(s) of this particular non-axisymmetric geometry of the surface of the part prevent(s) aerodynamic separation.

The operability of the compressor stages and the efficiency are improved as a result.

According to other advantageous and not limiting features:
  each fin has a width comprised between 5% and 20% of the distance between the intrados of the first blade and the extrados of the second blade;
  each fin has a height to width ratio comprised between 0.3 and 1.3;
  each fin has a height comprised between 1 mm and 25 mm;
  each fin has a height that increases along the fin from the leading position to the trailing position;
  each fin has a track corresponding to the median-camber line of the first and second blades;
  the trailing position associated with each fin is located at between 50% and 105% of the relative length of said blade chord;
  the leading and trailing positions associated with each fin are each located at a distance from the extrados of the second blade comprised between 10% and 55% of the distance between the intrados of the first blade and the extrados of the second blade;
  the surface defines two or three fins side by side;
  the platform comprises a first platform portion from which the first blade extends and a second platform portion from which the second blade extends, a connection between said first and second platform portions forming the fin;
  the surface is limited by a first and a second end plane, the surface being defined by at least one class $C^1$ construction curve, each representing the value of a radius of said surface as a function of a position between the intrados of the first blade and the extrados of the second blade along a plane substantially parallel to the end planes positioned between the leading position and the trailing position of each fin;
  each construction curve has been modeled by implementing, via data processing means, the steps of:
    (a) Parameterization of the construction curve as a class $C^1$ curve representing the value of the radius of said surface as a function of a position between the intrados of the first blade and the extrados of the second blade, the curve being defined by:
      Two end control points, respectively on each of the two blades between which said surface extends;
      At least one intermediate control point located between the end control points;
      At least one spline;
      the parameterization being implemented according to one or more parameters defining at least one of the control points;
    (b) Determination of optimized values of said parameters of said curve.
  the platform has an annular shape along which are regularly positioned a plurality of blades;
  the platform has the same non-axisymmetric surface between each consecutive pair of blades;
  the part is a bladed disk or a compressor stator stage.

According to a second aspect, the invention relates to a turbomachine comprising a part according to the first aspect.

PRESENTATION OF THE FIGURES

Other features and advantages of the present invention will be revealed upon reading the description that follows of a preferred embodiment. This description will be given with reference to the appended drawings wherein:
  FIG. 1, previously described, shows an example of a turbomachine;

DETAILED DESCRIPTION

Figure 2:
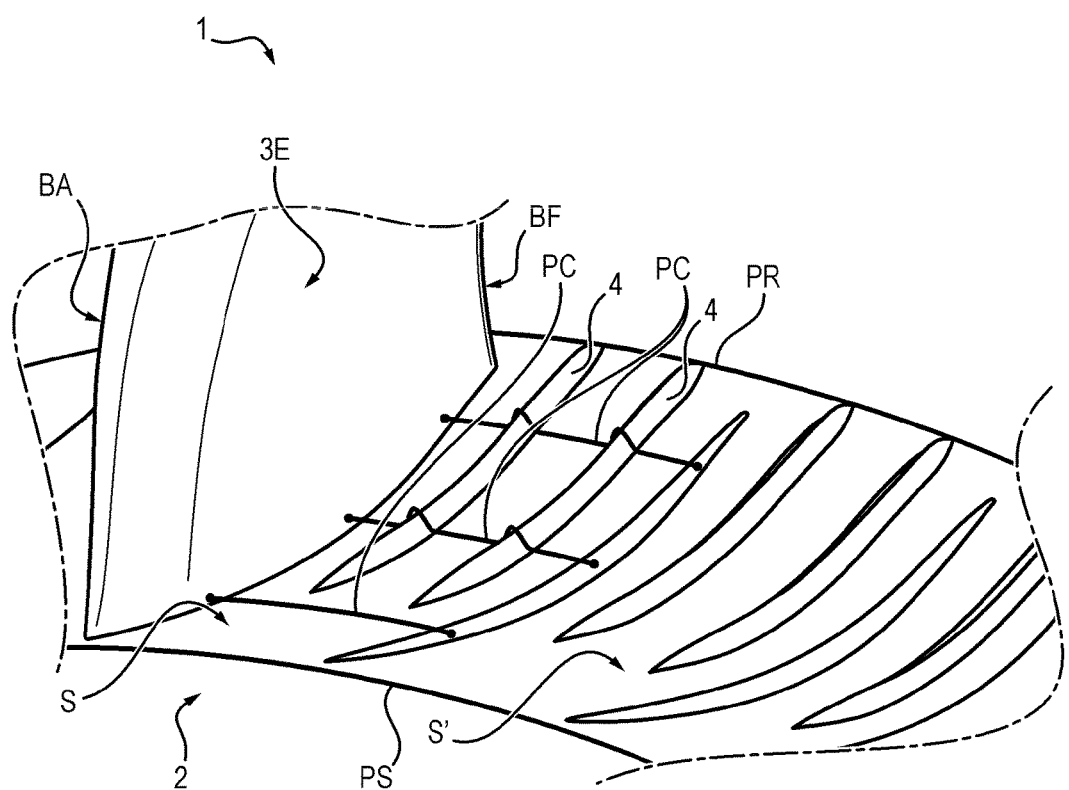
FIG. 2 shows a preferred embodiment of a part according to the invention.

Referring to FIG. 2, the present part 1 (or set of parts if it is not a single piece) of a turbomachine has at least two consecutive blades 3E, 3I and a platform 2 from which the blades 3E, 3I extend. The term platform is interpreted broadly here and generally designates any element of a turbomachine on which blades 3E, 3I are likely to be mounted (extending radially) and having an inner/outer wall against which air circulates.

In particular, the platform 2 can be in a single piece (and thus support all the blades of the part 1), or formed from a plurality of elementary members each supporting a single blade 3E, 3I (one "root" of the blade) so as to constitute a vane of the kind shown in FIG. 2. In particular, the platform 2 can comprise a platform portion 2I, 2E for each of the blades 3E, 3I in an advantageous embodiment which will be described below.

Figure 1:
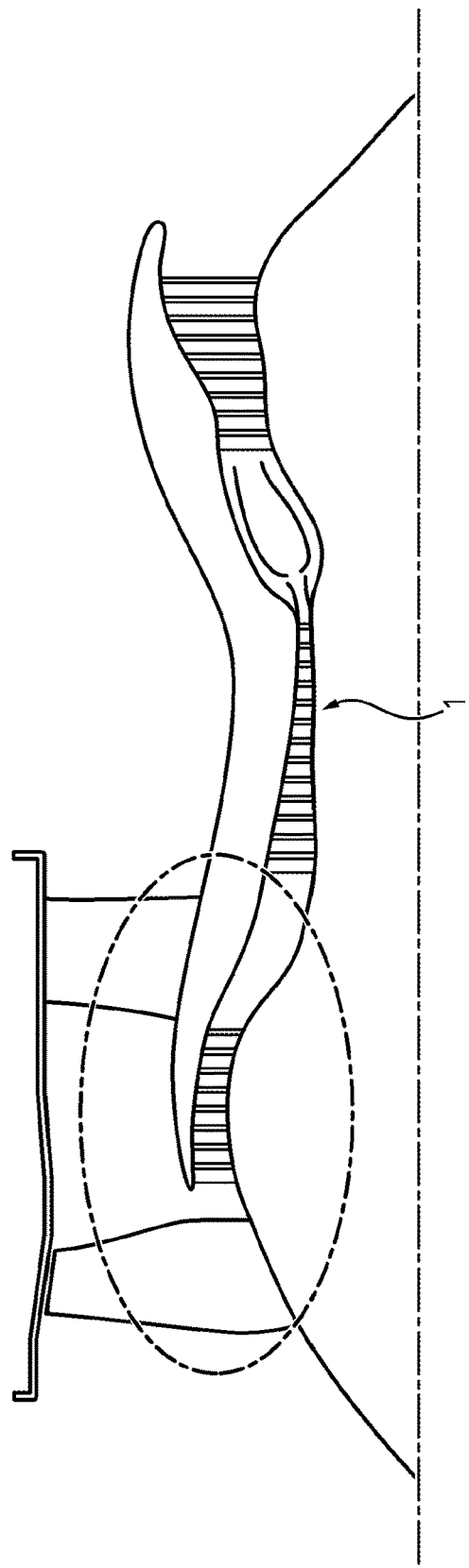

In addition, the platform 2 can delimit a radially inner wall of the part 1 (the gas passes around it) by defining a hub, and/or a radially outer wall of the part 1 (the gas passes inside it, the blades 3I, 3E extend toward the center) by then defining a casing of the part 1. It should be noted that the same part 1 can simultaneously comprise these two types of platform 2. It will be understood that, as explained, the part 1 can be of various types, particularly a rotor stage (blisk ("bladed disk") or impeller, depending on the integral character or not of the assembly) or a stator stage (fixed or movable vanes VSV ("Variable Stator Vane")), in particular at the secondary flow intake (OGV, "Outlet Guide Vane"), see FIG. 1 already introduced.

In the remainder of the present description, the example of an OGV stage will be used by way of an example, but the person skilled in the art will know how to transpose it to other types of parts 1 (for example to a "fan," in other words a blower, or to a low pressure compressor stage).

Platform Surface

The present part 1 is distinguished by a particular (non-axisymmetric) geometry of a surface S of a platform 2 of the part 1, an advantageous modeling whereof is observed in FIGS. 2.

The surface S extends between two blades 3E, 3I (of which only one is visible in FIG. 2 to allow better observation of the surface S. The track of the missing blade is observed, however, in each case), which limit it laterally.

The surface S is in fact a portion of a larger surface defining a substantially toroidal shape about the part 1. Assuming (but without limitation) a periodicity in the circumference of the part 1 (i.e, if the blades 3E, 3I are identical and uniformly distributed), the wall consists of a plurality of identical surfaces duplicated between each pair of blades 3E, 3I.

The surfaces S' also visible in FIG. 2 are thus a duplication of the surface S.

Also visible in this figure is a line dividing each of the surfaces S and S' into two halves. This structure corresponds to an embodiment wherein the platform 2 consists of a plurality of elementary members, each being a root supporting an blade 3E, 3I with which it forms a vane. Each of these blade roots (called "platform portions" in the remainder of the present description) thus extends on either side of the blade 3E, 3I, hence the fact that the surface S comprises juxtaposed surfaces associated with two distinct blade roots. The part 1 is therefore a set of at least two juxtaposed vanes (a blade/blade root assembly). These are considered "integrated" platforms as opposed to "applied" platforms, independent in other words of the blades (the surface S can then consist of a single element). It will be understood that the present invention is not limited to any particular structure [of] the platform 2.

The surface S is limited upstream by a first end plane, the "separation plane" PS and downstream by a second end plane, the "connection plane" PR, each of which defines a continuous axisymmetric contour with a continuous derivative (the curve corresponding to the intersection of each of the planes PR and PS and the surface of the part 1 is generally closed and forms a loop). The surface S has a substantially parallelogram shape and extends continuously between the two end planes PS, PR and the two blades 3E, 3I of a pair of consecutive blades. One of the blades of this pair of blades is the first blade 3I, or intrados blade. It presents in fact its intrados to the surface S. The other blade is the second blade 3E, or extrados blade. It in fact presents its intrados to the surface S. Each "second blade" 3E is the "first blade" 3I of an adjoining surface such as the surface S' in FIG. 2 (because each blade 3E, 3I has a intrados and an extrados).

The surface S is advantageously defined by construction curves PC, also called "construction planes." Each construction curve PC is a class $C^1$ curve representing the value of a radius of said surface S as a function of a position between the intrados of the first blade 3I and the extrados of the second blade 3E along a plane substantially parallel to the end planes PS, PR.

What is meant by radius is the distance between a point on the surface and the axis of the part 1. An axisymmetric surface therefore has a constant radius.

A construction curve PC is typically a spline, i.e, a parametric polynomial curve, among which can preferably be mentioned Bézier curves.

Fin

The non-axisymmetric surface S of the present part is notable in that it defines at least a plurality of fins 4 with a substantially triangular section extending downstream of a leading edge (BA) of each of the blades 3I, 3E. Preferably, there are two or three fins 4 on the stream (FIG. 2 shows a solution with two fins 4, the different possibilities will be described below).

The fact of having fins available between two blades of a part is known (see for example patent applications EP1927723, JP6022002, U.S. Pat. No. 4,023,350). But known fins are generally flat "strips." In fact, these known fins (which are generally numerous) only have the role of acting as a barrier for the incident flow, and for generating vortices.

The present fins 4 are intended to improve the deflection of the incident flow, and to avoid the upwelling of fluid along the extrados. In this manner, the fins 4 improve the efficiency and the operability of a compressor stage, and prepare a cleaner/more homogeneous fluid for the following stages.

In particular, an increase in vorticity appears at the leading edges of the present fins 4, but further downstream the reduction in the crossing vortex prevails and the intensity of the vortex diminishes by up to 6%. The addition of at least one fin 4 thus decreases separation at the trailing edge. This is the direct consequence of the guiding effect of the fins on the flow at the boundary layer. Less energy strikes the extrados of the second blade 3E, thus the stream lines can rise only with greater difficulty. The height of the separation can be reduced by half (see below for the comparison of 5 different embodiments).

In all cases, the fins 4 have a substantially triangular cross-section, which means that they have two oblique faces joined by a dorsal crest, either at an angle or by a tangent connection. The two faces themselves are attached to the stream (remainder of the surface S) either at an angle or by a tangent connection. Each fin 4 can further have beveled ends as can be seen in FIG. 2.

Preferably, each fin 4 has a track (i.e, a trajectory) corresponding to the median-camber line of the first and second blades 3I, 3E. More often, all the blades have the same camber, that is why all the fins 4 and blades 3I, 3E have a similar curvature, but it will be understood that the invention is not limited to this case.

Figure 3:
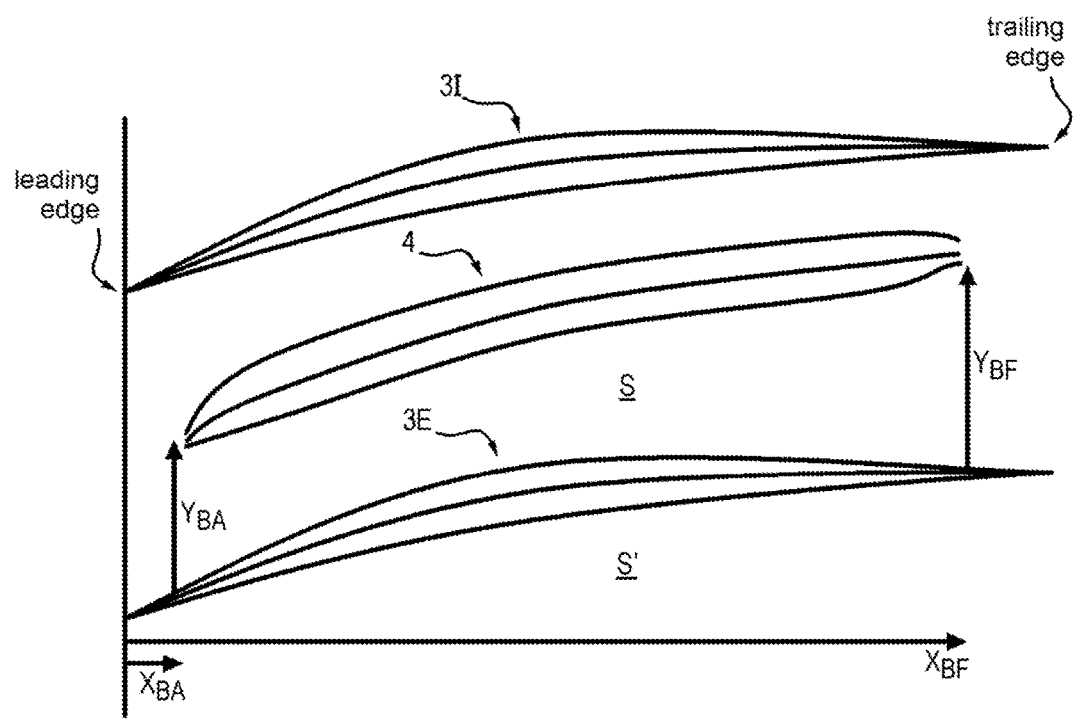
FIG. 3 shows schematically the geometry of a fin of a part according to the invention.

This appears, in particular in FIG. 3 (the cambers of the blades 3I, 3E and the track of the fin 4 are mean lines shown for each of the elements), which shows schematically an isolated fin 4.

It should be noted that the fins 4 offer another advantage: they can be used as a heat exchanger to facilitate the cooling of the part 1.

Dimensions and Position

The fins 4 advantageously have a width comprised between 5% and 20% (preferably between 10% and 15%) of the distance between the intrados of the first blade 3I and the extrados of the second blade 3E. The width considered here is the maximum width of the root of the fin 4 (which is substantially constant, excluding the leading and trailing bevels). This width and the distance between the intrados of the first blade 3I and the extrados of the second blade 3E are best understood along planes parallel to the end planes PS, PR (in other words along the construction curves mentioned previously), which are visible in FIG. 2, and shown vertically in FIG. 3.

Preferably, each fin 4 has a height to width ratio comprised between 0.3 and 1.3, which at conventional dimensions for compressor stages gives a height comprised between 1 mm and 25 mm.

Each fin 4 in particular is defined by two end points: a leading position and a trailing position on the surface S, between which the fin 4 extends (in particular following the camber of the blades 3I, 3E).

The leading position is defined in the reference symbols of FIG. 3 by coordinates $X_{BA}$ and $Y_{BA}$, and the trailing position by coordinates $X_{BF}$ and $Y_{BF}$. These coordinates are respectively an axial coordinate and an azimuth coordinate of the position.

The first coordinate X designates an (axial) position along a chord of blade 3I, 3E extending from a leading edge BA to a trailing edge BF of the blade 3I, 3E, expressed in relative length (in other words, X=0 corresponds to an alignment on the leading edges BA and X=1 corresponds to an alignment with the trailing edges BF of blades 3I, 3E).

And preferentially, these positions are such that:
  the (axial) leading position is located between 5% and 35% (preferably between 15% and 25%) of the relative length of the blade 3I, 3E chord (i.e. $X_{BA} \in [0.05, 0.35]$), and
  the (axial) trailing position located at between 50% and 105% (preferably between 70% and 85%) of the relative length of the blade 3I, 3E chord (i.e. $X_{BF} \in [0.5, 1.05]$).

It will be noted that the fin 4 is not necessarily comprised between the leading edge BA and the trailing edge BF of the blades 3I, 3E and can extend axially downstream of the trailing edge BF.

The second coordinate Y designates an (azimuth) position along a channel width extending from the extrados of the second blade 3E to the intrados of the first blade 3I, expressed in relative length (in other words, Y=0 corresponds to a point against the extrados of the second blade 3E and Y=1 corresponds to a point against the intrados of the first blade 3I).

And preferably, these positions are such that each of the leading and trailing positions associated with a fin 4 is located at a distance from the extrados of the second blade 3E comprised between 10% and 55% of the channel width (i.e. $Y_{BA}$, $Y_{BF} \in [0.1, 0.55]$). The fin(s) 4 can therefore be centered in the stream, but are preferably closer to the extrados of the second blade 3E.

Generally, the more a fin 4 is separated from the extrados of the second blade 3E, the more the (axial) leading position of said fin 4 is separated from the leading edge BA of the blades 3I, 3E. In other words, starting from the extrados, the fins are stepped, with increasing $X_{BA}$.

Figure 5A:
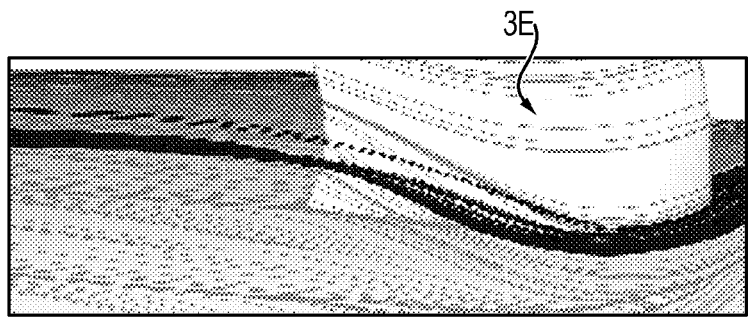
FIGS. 5a-5c show observation results of the flow and friction lines for three geometries.

This geometry allows progressive amplification of the incident flow deflection effect, which is desirable to the extent that the observed upwelling of the fluid is progressive along the extrados and the migration of the fluid occurs from the intrados toward the extrados (see FIG. 5a which will be described below). The stepping of the fins 4 thus improves the uniformity of the flow near the bottom of the stream and further reduces the separation height.

Preferably as well, each fin 4 also has a height that increases along the fin 4 from the leading position to the trailing position, i.e. with increasing axial position. The progressiveness of the height of the fins 4, correlated with the stepping of the fins 4, also improves the uniformity of the flow near the bottom of the stream and the reduction of the separation height. The height of the fins can in particular have linear or quadratic variation with the axial position.

It should be noted that the maximum height of the fins 4 can decrease with distance from the extrados of the second blade 3E, so as to amplify the joint effect of stepping and of the variable height of the fins 4.

Number of Fins

The best results are obtained for two fins 4. It is desirable not to exceed three fins 4.

Using two fins, these can be arranged in the middle of each of the portions 2I, 2E of the platform 2 (as can be seen in FIG. 2), but preferably the fins 4 should be rather on the extrados side of the stream. For example, a first fin can be associated with azimuth positions $M_{BA}$, $Y_{BF} \in [0.2, 0.25]$, and a second fin associated with azimuth positions $M_{BA}$, $Y_{BF} \in [0.5, 0.55]$.

In the case where one of the fins 4 is positioned in the middle of the stream (leading and trailing positions associated with the fin 4 located at a distance from the extrados of the second blade 3E at about 50% of the channel width), it is possible to use the structure of the platform 2 to reconstitute this fin 4. Thus, if the platform 2 comprises a first platform portion 2I from which the first blade 3I extends and a second platform portion 2E from which the second blade 3E extends, the connection between the two portions 2I, 2E of the platform 2 can be provided to correspond to the track of the fin 4.

Figure 4:
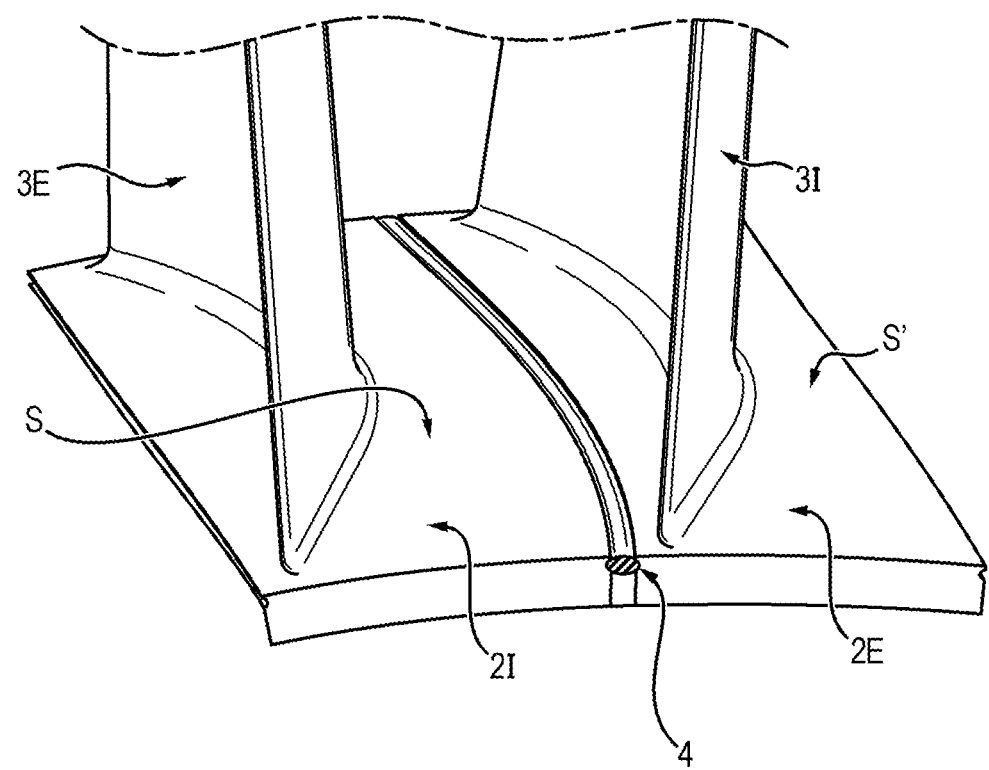
FIG. 4 shows schematically a structure for achieving a single-piece fin according to the invention.

A protruding inter-platform connection of suitable shape can then form the fin (as can be seen in FIG. 4, which does not show the other fins 4).

This solution has numerous advantages, because it requires only a few modifications with respect to known parts and can facilitate assembly/disassembly by allowing greater tangential clearances between the platform 2 portions.

Alternatively or as a supplement, at least one fin 4 is inherent in the surface S, and the use of construction curves PC makes it possible to define them (which is also true in the case of a single fin 4 if it is not obtained through a connection). Preferably, at least three construction curves are used, as can be seen for example in FIG. 2, where there are seven: one leading curve (which passes through the leading point defined previously), at least one central curve, and a trailing curve (which passes through the trailing point also defined previously). The central curve(s) (the number of which may vary) are advantageously positioned at regular intervals. The first and the second central curve can be positioned at the junction between the bevel and the body of one of the fins 4. The trailing curve of one fin 4 can be a central curve of another, and so on.

It is noted that the trailing curve can conveniently be confounded with the connecting plane PS (the fin 4 extends beyond the trailing edge). On the other hand, there can be other construction curves positioned upstream or downstream of any fin 4 (and therefore not contributing to define the latter).

Each construction curve PC is thus defined by a plurality of control points (end and intermediate, at least one intermediate control point (and even two for central curves) being required per fin 4 for each construction curve PC positioned between the leading position and the trailing position of a fin 4). The parameter(s) defining a control point are selected from among either an abscissa of the point, an ordinate of the point, an orientation of the tangent to the curve at the point and one (in the case of an end control point, only the semi-tangent in the domain of definition of the curve can be taken into account, to the left or to the right depending on the point) or two (in the case of an intermediate control point) tension coefficients each associated with a semi-tangent to the curve at the point.

The positions of the end control points are constrained by the blades 3I, 3E. On the other hand, the orientations of the tangent to the curve at these points (the derivatives, in other words) make it possible to check the slopes of the surface S, in particular those of the flanks of a fin 4 (and hence its width and its height).

Modeling of the Surface

The definition of the surface using construction curves PC facilitates the automatic optimization of the part 1.

Each construction curve PC can thus be modeled by means of the suitable implementation of:
(a) Parameterization of the construction curve PC as a class $C^1$ curve representing the value of the radius of said surface S as a function of a position between the intrados of the first blade 3I and the extrados of the second blade 3E, the curve being defined by:
  Two end control points, respectively on each of the two blades 3E, 3I between which said surface S extends
  At least one (advantageously two) intermediate control points located between the end control points;
  At least one spline;
  the parameterization being implemented according to one or more parameters defining at least one of the control points;
(b) Determination of optimized values of said parameters of said curve.

These steps are carried out by computer equipment comprising data processing means (for example a supercomputer).

Certain parameters of the end or intermediate control points, for example the skew intervals of the tangents, are fixed, so as to satisfy the desired slope conditions.

Numerous criteria can be selected as criteria to be optimized during the modeling of each curve. By way of example, one can attempt to maximize the mechanical properties such as resistance to mechanical loads, frequency response, displacements of the blades 3E, 3I, aerodynamic properties such as efficiency, pressure rise, flow capacity or pumping margin, etc.

For that purpose it is necessary to parameterize the law that one is seeking to optimize, i.e, to make of it a function of N input parameters. The optimization then consists of varying (generally randomly) these different parameters with constraints, until their optimal values are determined for a predetermined criterion. A "smoothed" curve is then obtained by interpolation from the determined transit points.

The number of calculations necessary is then directly linked (linearly or exponentially) to the number of input parameters of the problem.

Numerous methods are known, but preferably a method similar to that described in patent FR1353439 will be implemented, which makes possible excellent modeling quality without high computing power consumption, while still limiting the Runge phenomenon (excessive "undulation" of the surface).

It should be noted that the blade 3E, 3I is connected to the platform 2 through a connection curve, which can be the subject of specific modeling, in particular also using splines and user control points.

Effect of the Fins

Figure 5B:
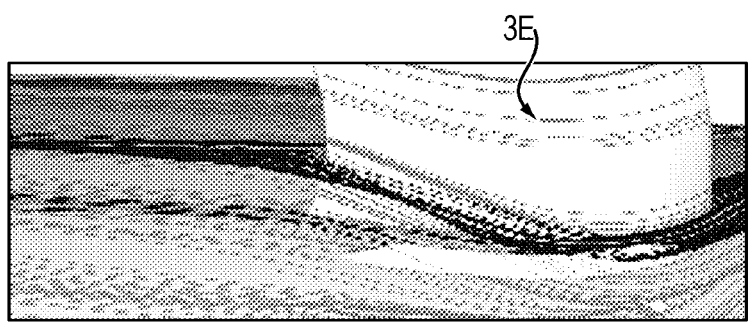
Figure 5C:
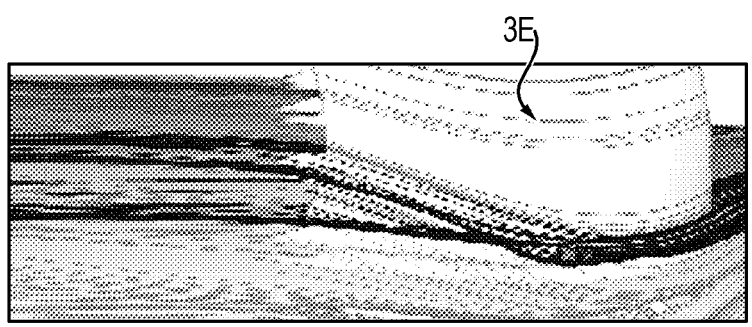

Flow and friction lines have been observed along the extrados of the second blade 2E: geometry without fins (FIG. 5a), non-axisymmetric geometry with a single fin (FIG. 5b) and non-axisymmetric geometry with two fins (FIG. 5c).

Clearly seen in FIGS. 5b and especially 5c is the reduction in the separation height, which drops by nearly 33%. The increase in vorticity reaches 2.3% for one fin, and 3.8% for two fins, hence an increase in efficiency of a few tenths of a percent.

The invention claimed is:
1. A part or set of parts of a turbomachine comprising:
at least first and second blades, and a platform from which the first and second blades extend, wherein
the platform has, between an intrados of the first blade and an extrados of the second blade, a non-axisymmetric surface defining fins with a substantially triangular section extending downstream of a leading edge of each of the first and second blades, every fin being associated with a leading position and a trailing position on the surface between which the fin extends, such that:
the leading position is located at between 5% and 35% of a relative length of a chord of the first or second blade extending from a leading edge to a trailing edge of the first or second blade;
the larger the distance between a fin and the extrados of the second blade, the more the leading position of said fin is axially separated from the leading edge of the first and second blades.

2. The part or set of parts according to claim 1, wherein every fin has a width in the range of 5% to 20% of a distance between the intrados of the first blade and the extrados of the second blade.

3. The part or set of parts according to claim 1, wherein every fin has a height to width ratio in the range of 0.3 to 1.3.

4. The part or set of parts according to claim 1, wherein every fin has a height in the range of 1 mm to 25 mm.

5. The part or set of parts according to claim 1, wherein every fin has a height that increases along the fin from the leading position to the trailing position.

6. The part or set of parts according to claim 1, wherein every fin has a track corresponding to a median-camber line of the first and second blades.

7. The part or set of parts according to claim 1, wherein the trailing position associated with every fin is located at between 50% and 105% of the relative length of said blade chord.

8. The part or set of parts according to claim 7, wherein the leading and trailing positions associated with every fin are each located at a distance from the extrados of the second blade in the range of 10% to 55% of a distance between the intrados of the first blade and the extrados of the second blade.

9. The part or set of parts according to claim 1, wherein said fins comprise only two or three fins side by side.

10. The part or set of parts according to claim 1, wherein the surface is limited by a first and a second end plane, the surface being defined by at least one class C1 construction curve representing a value of a radius of said surface as a function of a position between the intrados of the first blade and the extrados of the second blade along a plane substantially parallel to the end planes positioned between the leading position and the trailing position of every fin.

11. The part or set of parts according to claim 1, wherein the platform has an annular shape along which are regularly positioned a plurality of blades including said at least first and second blades.

12. The part or set of parts according to claim 11, wherein the platform has the same nonaxisymmetric surface between each consecutive pair of blades.

13. The part or set of parts according to claim 12, being a bladed disk or a compressor stator stage.

14. A turbomachine comprising a part or set of parts comprising:
   at least first and second blades, and a platform from which the first and second blades extend, wherein
   the platform has, between an intrados of the first blade and an extrados of the second blade, a non-axisymmetric surface defining fins with a substantially triangular section extending downstream of a leading edge of each of the first and second blades, every fin being associated with a leading position and a trailing position on the surface between which the fin extends, such that:
   the leading position is located at between 5% and 35% of a relative length of a chord of the first or second blade extending from a leading edge to a trailing edge of the first or second blade;
   the larger the distance between a fin and the extrados of the second blade, the more the leading position of said fin is axially separated from the leading edge of the first and second blades.

* * * * *

UNITED STATES PATENT AND TRADEMARK OFFICE
CERTIFICATE OF CORRECTION

PATENT NO.        : 10,519,980 B2
APPLICATION NO.   : 15/105359
DATED             : December 31, 2019
INVENTOR(S)       : Vianney Christophe Marie Maniere et al.

Page 1 of 1

It is certified that error appears in the above-identified patent and that said Letters Patent is hereby corrected as shown below:

In the Specification

Column 6, Line 51, change "positions $M_{BA'}$" to --positions $Y_{BA'}$--; and
Column 6, Line 52, change "positions $M_{BA'}$" to --positions $Y_{BA'}$--.

Signed and Sealed this
Twenty-third Day of June, 2020

Andrei Iancu
*Director of the United States Patent and Trademark Office*